United States Patent [19]

Cline

[11] Patent Number: 5,259,912
[45] Date of Patent: Nov. 9, 1993

[54] CONTINUOUS IN-LINE LABELER FOR FLEXIBLE BOTTLES

[75] Inventor: Carl L. Cline, Loveland, Ohio
[73] Assignee: Spear, Incorporated, Mason, Ohio
[21] Appl. No.: 870,496
[22] Filed: Apr. 16, 1992
[51] Int. Cl.⁵ .............................................. B65C 9/00
[52] U.S. Cl. .................................. 156/566; 156/156; 156/287; 156/538; 53/88
[58] Field of Search ............... 156/156, 285, 287, 556, 156/566, 538; 53/88, 98, 110

[56] References Cited

U.S. PATENT DOCUMENTS

| | | | |
|---|---|---|---|
| 2,725,156 | 11/1955 | Manas | 156/566 X |
| 3,058,514 | 10/1962 | Flood | 156/542 |
| 3,928,115 | 12/1975 | Kerwin | 156/363 |
| 4,180,105 | 12/1979 | Harvey | 156/156 |
| 4,192,703 | 3/1980 | Brown | 156/443 |
| 4,214,937 | 7/1980 | Geurtsen et al. | 156/361 |
| 4,239,569 | 12/1980 | Harvey | 156/156 |
| 4,253,904 | 3/1981 | Jodrey et al. | 156/497 |
| 4,283,184 | 8/1981 | Berg | 198/834 X |
| 4,290,519 | 9/1981 | Harvey | 198/483 |
| 4,315,795 | 2/1982 | Jodrey et al. | 156/542 |
| 4,675,070 | 6/1987 | Pasternicki | 156/156 X |
| 4,798,648 | 1/1989 | Freeman | 156/542 |
| 4,806,197 | 2/1989 | Harvey | 156/449 |
| 4,931,122 | 6/1990 | Mitchell | 156/215 |

FOREIGN PATENT DOCUMENTS

0667473 7/1963 Canada .

Primary Examiner—David A. Simmons
Assistant Examiner—James J. Engel, Jr.
Attorney, Agent, or Firm—Frost & Jacobs

[57] ABSTRACT

There is provided an apparatus for continuous in-line labeling of flexible walled bottles of predetermined height, having a pair of substantially continuous lower and upper conveyor members substantially longitudinally aligned to provide an inlet end and an outlet end. The upper conveyor member includes a substantially endless chain supporting a plurality of downwardly depending compression wedges spaced therealong, whereby successive bottles to be labeled are received at the inlet end in partially compressed relationship between the top surface of the lower conveyor and the compression wedge. The apparatus can be selectively adjusted such that the vertical spacing between the top surface of the lower conveyor and the wedges of the upper conveyor appropriately compressively accommodate bottles of various heights. An air pulse station is located above and spaced from the compression wedges in order to direct pressurizing gas through the moving endless chain and into the bottles received in a compression wedge as it passes thereby. The pulsed air inflates the compressively held flexible bottle to resist the compression fit between the conveyor members, thereby relatively rigidly maintaining the bottle in its upright condition as it moves along the labeling apparatus past at least one labeling station. The air pulse is provided through unducted space within the single chain drive of the upper conveyor, thereby obviating a need for complex pressure tubes and fittings or dynamic seals.

20 Claims, 5 Drawing Sheets

FIG. 4

CONTINUOUS IN-LINE LABELER FOR FLEXIBLE BOTTLES

TECHNICAL FIELD

This invention relates to labeling devices for thin-walled bottles and similar hollow containers, and, more particularly, to a simplified continuous in-line labeling apparatus for flexible walled bottles having a predetermined height, wherein the bottles are compressively and sealingly received between a pair of opposed conveyor members and the interior of the bottle is pressurized by a predetermined volume of gas applied to the bottle from a spaced pulse station, whereby the compressively held bottles are maintained in relatively rigid condition during conveyance of the bottles along the length of the labeling apparatus and past a plurality labeling stations. The vertical spacing between the upper and lower conveyors is selectively adjustable to accommodate bottles of various predetermined heights, providing both simplicity and adaptability for a wide variety of labeling applications.

BACKGROUND ART

Both environmental and economical considerations dictate that product packaging be optimized whenever possible. This fact is quite evident in the field of plastic packaging wherein the amount of material utilized for plastic bottles and other hollow containers is generally minimized wherever possible. The optimization of these plastic containers has often manifested itself in thinner, more flexible walls. New molding technologies and material innovation has enabled the evolution of plastic bottles and the like to the point where container walls are often quite flexible and conformant to external pressure. While such characteristics are often desirable for product dispensing, packaging costs and other operational characteristics, they present problems for labeling and other decorating procedures.

Moreover, while product containers are often relatively rigid and stable when fully loaded with product, labeling and other decorating procedures are generally and preferably undertaken prior to product packaging and/or filling operations. In this regard, the unfilled containers generally feature their maximum flexibility and conformance during the labeling operations. Because many labeling operations (e.g., pressure sensitive labeling, heat and pressure labeling, and the like) require external pressure, the flexibility of the thin walls of such containers presents a real problem. In this regard, it has been found that pressurizing a flexible container from within during labeling operations can effectively rigidity the container and prevent its flexing during decorating procedures.

For example, U.S. Pat. Nos. 4,253,904 and 4,315,795 (which issued to Jowdrey et al.); U.S. Pat. No. 4,806,197 (which issued to Harvey); and U.S. Pat. No. 4,214,937 (which issued to Geurtsen et al.) describe various decorating and labeling machines which utilize internal pressure applied to flexible bottles for rigidity during labeling and the like. As decoration of bottles and similar articles is generally desired to be accomplished at relatively high speeds, these devices all contemplate movement or rotation of the structure upon which the bottle is supported, at least before and after decorating procedures. As a result, relatively complex and/or cumbersome arrangements of air lines, ducts, rotating joints, and channels have been required to accommodate air inflation of moving bottles. In addition to the added capital expenditures required for this complex arrangement of structures, assembly, adjustment, and maintenance procedures, and inconvenience are also correspondingly increased.

An in-line system including air pressure support of relatively flexible bottles is described in U.S. Pat. No. 4,180,105; 4,239 569; and 4,290,519 (which issued to A. Harvey) wherein plastic bottles and the like are stabilized on a conveyor system by application of vacuum to their lower portions, and successive supported bottles are inflated via an elongated opening in a manifold groove during the period in which each is engaged by heat transfer labeling rollers. The Harvey labeling system, however, requires a relatively complex arrangement of vacuum lines, and seals for supporting the articles along the line, as well as a relatively inefficient system of grooves, manifold structure, and sealing arrangements for delivery of air pressure adjacent a labeling station. Moreover, the Harvey set-up is not easily adaptable to a variety of different container shapes and sizes, as it requires relatively specific support receptacles and belting arrangements for its cup-shaped inflating nozzles.

Similarly, other bottling labeling machines, such as shown and described in Canadian patent 667,473 (which issued to C. Flood) includes a conveyor for moving flexible bottles past a label applying station, and spaced conveyor holders which telescope onto the mouth of the bottle so that the bottle may be rotated about its axis for labeling. The device further includes a plurality of hollow conveyor projecting pins which fit into the bottle mouths and allow the bottles to be inflated while being labeled. Resilient bottles may be inflated as they pass the label apply station. As mentioned above with regard to other prior devices, the hollow pins of the Flood device are required to move with the bottles as they travel along the labeling machine, requiring additional dynamic seals and limiting the space available for labeling or otherwise decorating the container.

Consequently, while there have been numerous attempts to provide automatic labeling machinery to accommodate high-speed decoration of containers having flexible sidewalls, heretofore there has not been available a machine of relatively simple design which can be easily adjusted and adapted to accommodate a wide variety of sizes, shapes and flexibility of containers and bottles. Additionally, devices incorporating air inflation features for effectively rigidifying flexible containers for labeling procedures have often required relatively complex combinations of moving structures and seals providing less than optimum versatility, reliability, and convenience.

DISCLOSURE OF THE INVENTION

It is an object of this invention to overcome the above-described problems and shortcomings of the air inflation labeling devices and procedures heretofore available in the industry.

It is another object of the present invention to provide an improved in-line and continuous labeler for flexible bottles and similar containers.

It is also an object of the present invention to provide a continuous in-line labeler for flexible containers which is relatively simple in construction and operation, and is easily adaptable to a relatively wide variety of container shapes and sizes.

It is yet another object of the present invention to provide a labeling apparatus with an improved air inflation arrangement, wherein a container is uniformly pressurized by a relatively simple pulse-type pressurizing arrangement, and remains pressurized during a substantial portion of its movement along the labeling device past one or more labeling stations.

It is also an object of the present invention to provide an improved container sealing and conveying apparatus which comprises a combination of modular and quickly interchangeable pieces with simple and reliable supporting structure.

In accordance with one aspect of the present invention, there is provided an apparatus for continuous in-line labeling of flexible walled bottles of predetermined height, having a pair of substantially continuous longitudinally aligned lower and upper conveyor members having an inlet end and an outlet end. The upper conveyor member includes a substantially endless chain supporting a plurality of downwardly depending compression wedges spaced therealong, whereby successive bottles to be labeled are received at the inlet end in partially compressed relationship between the top surface of the lower conveyor and an at least partially compressible portion of the compression wedge. The apparatus can be selectively adjusted such that the vertical spacing between the top surface of the lower conveyor and the wedges of the upper conveyor appropriately compressively accommodate bottles of various heights. An air pulse station is located above and spaced from the compression wedges in order to direct pressurizing gas through the endless chain and into the bottles as they pass thereby. The pulsed air inflates each successive compressively held flexible bottle to resist the compression fit between the conveyor members, thereby helping to relatively rigidly maintain each bottle in its upright condition as it moves along the labeling apparatus past at least one labeling station.

In a preferred embodiment, the apparatus includes a single link-type chain to which the compression wedges are releasably attached, with the chain having a substantially continuous backup member extending along a substantial portion of the longitudinal length to facilitate and maintain the compression fit of bottles moving therealong. It is also preferred to provide each compression wedge with a relatively centrally located compressible sealing pad and a one-way air valve extending through the pad. A sensing mechanism may be incorporated with the air-pulse station to indicate when a bottle is aligned for compression fit between the spaced lower and upper conveyors, and ready for air inflation. The sensing mechanism triggers a timing mechanism to provide an appropriate pulse of air to a passing bottle.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
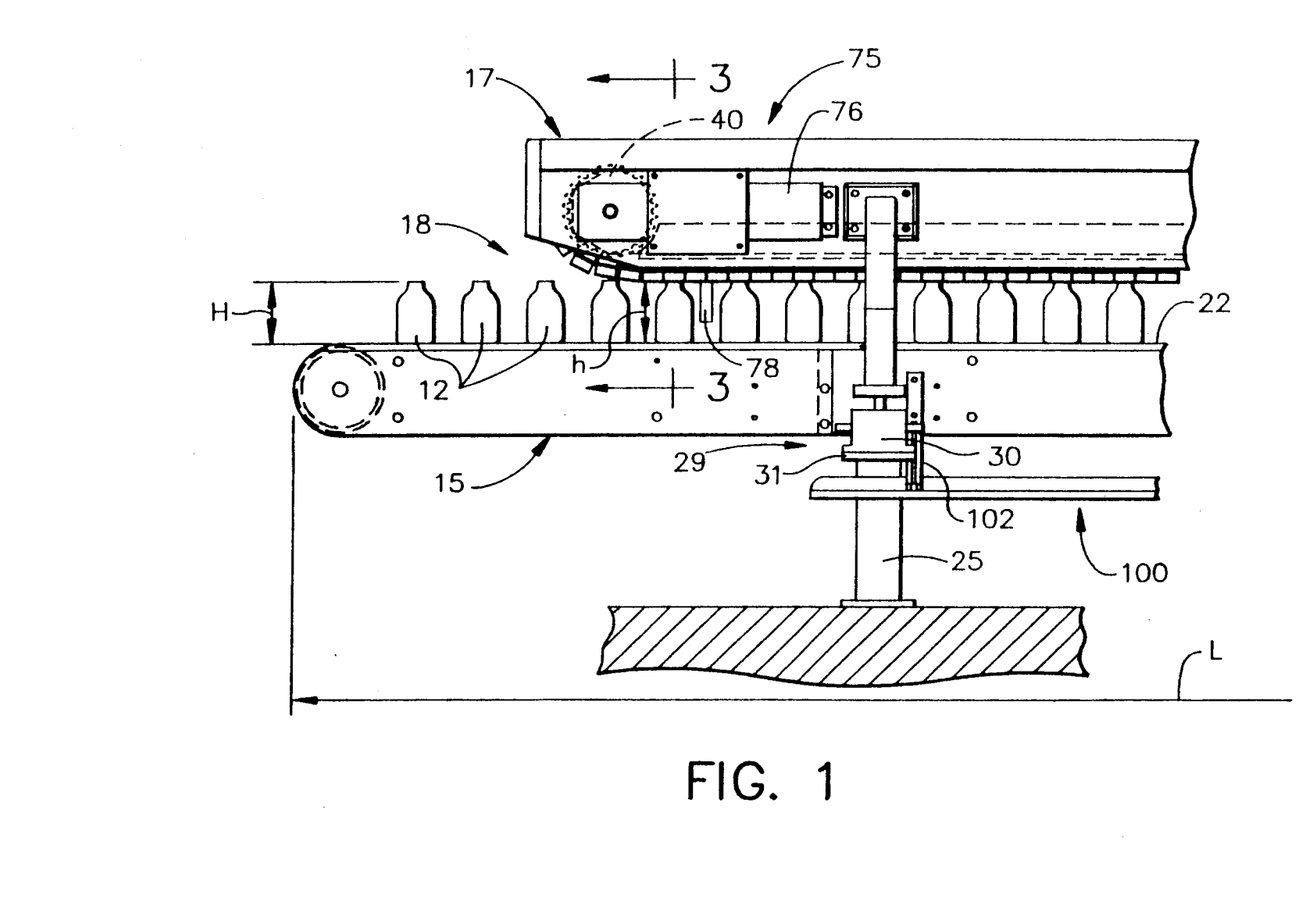
FIGS. 1 and 1A together illustrate a partially broken-out, side elevational view of an in-line labeling apparatus illustrating and incorporating the present invention.
Figure 1A:
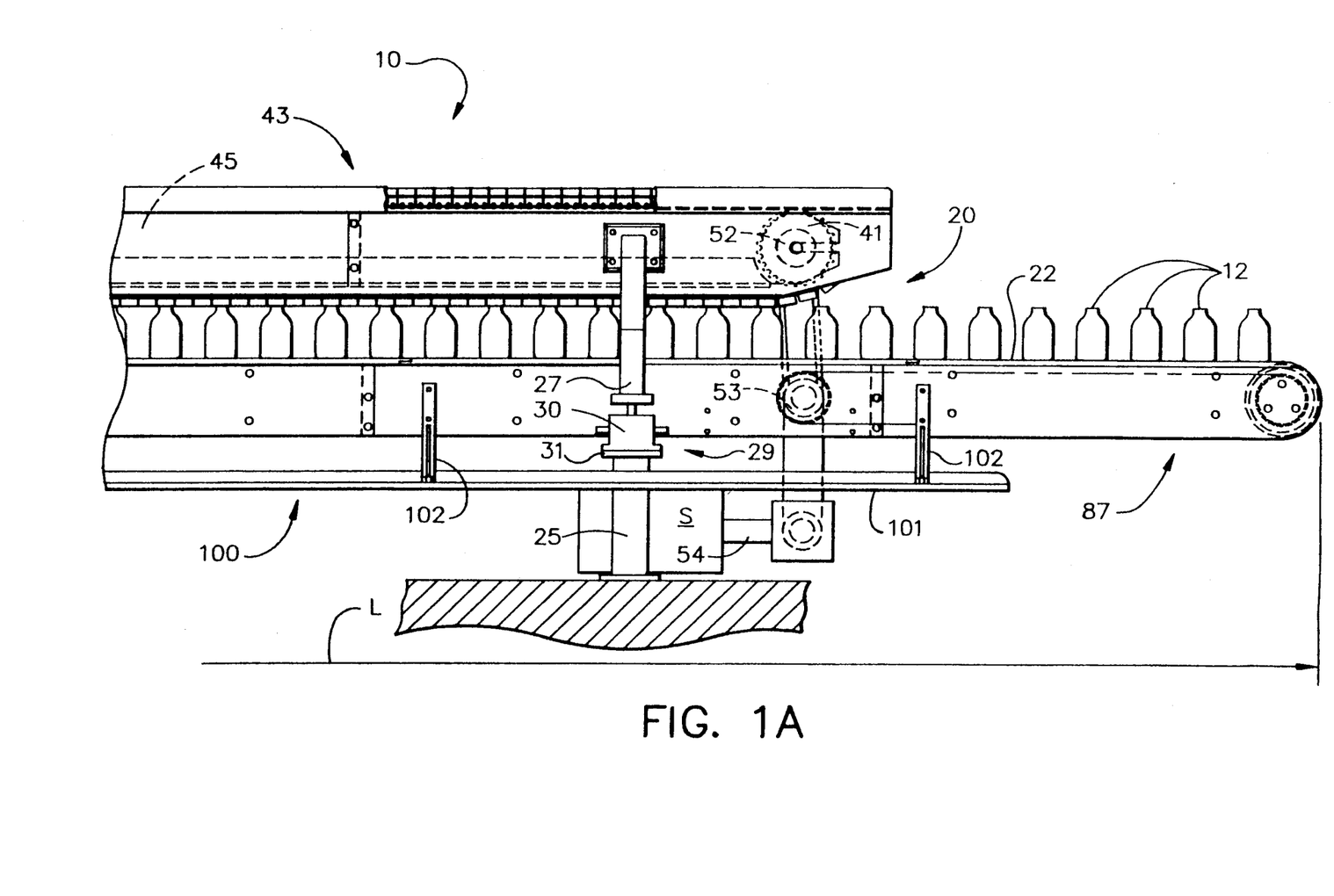

Referring now to the drawings in detail, wherein like numerals indicate the same elements throughout the views, FIGS. 1 and 1A (sometimes referred to jointly as FIG. 1) show a partial side elevational view of a preferred in-line labeling apparatus set-up incorporating the teachings and method of the present invention. Particularly, FIG. 1 illustrates in-line labeler 10 made in accordance with the present invention. Labeler 10 is shown as comprising a lower conveyor 15 and a vertically spaced upper conveyor 17 substantially aligned with one another along longitudinal axis A (see FIG. 2). Lower and upper conveyors 15 and 17, respectively each have corresponding front (or inlet) ends and rear (or outlet) ends, wherein the space between the conveyors respectfully provides a labeler inlet (e.g., 18) and an outlet (e.g., 20) adjacent such front and rear ends. A plurality of supports (e.g., 25) provide a base to which lower conveyor 15 can be attached, and it is preferred that upper conveyor supports 27 will also be conveniently attached in conjunction with supports 25.

To facilitate vertical adjustability of the relative positions of the lower and upper conveyors 15 and 17, it is preferred that means (e.g., 29) for selectively adjusting the vertical spacing be provided therebetween. As illustrated, adjustment means 29 can comprise a jack arrangement including a rotating member 30 telescoped over a threaded support 31. Adjustment means 29 can similarly comprise manual, semi-automatic, and/or fully automatic devices, which might be tied through computer software or the like to an overall device controller 85 to facilitate automatic operation.

Figure 2:
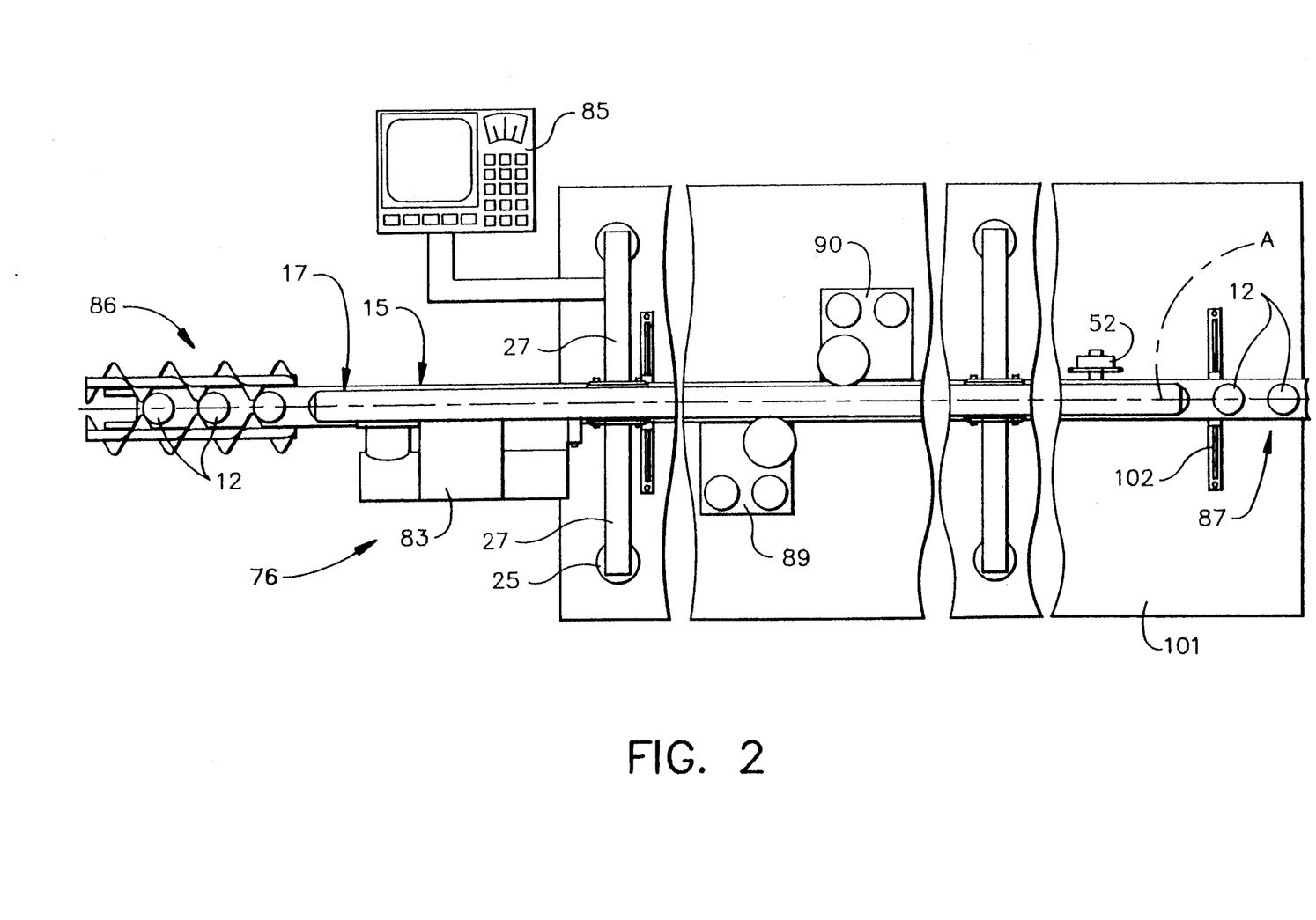
FIG. 2 is a top plan view of the labeling apparatus of FIG. 1.

Lower conveyor 15 can comprise any of a variety of flat top or table top chain conveyors, belt conveyors or the like, and is illustrated in FIGS. 1 and 2 as including a relatively flat upper surface 22 upon which a plurality of bottles (e.g., 12) or similar flexible walled containers can be supported and moved along longitudinal axis A. FIGS. 1 and 1A illustrate conveyor 15 as being supported by a support structure 100 attached to supports 25 and including a plate 101 and a plurality of spaced gussets 102. As will be appreciated, bottles 12 have a substantially uniform predetermined height H, and will generally feature a standard bottle-type configuration with a closed lower end, relatively flexible sidewalls, and an upper end having a dispensing opening oriented generally upwardly. As illustrated, lower conveyor 15 can preferably comprise an endless conveyor rotated around oppositely disposed conveyor rollers by an appropriate drive mechanism. As will be described, because vertical compression of the containers 12 processed through labeling apparatus 10 will be required between lower and upper conveyors 15 and 17, respectively, it will be necessary for upper surface 22 of lower conveyor 15 to be adequately supported from below along a substantial portion of its longitudinal length L. Such support can be provided in a variety of conventional ways, and will not be further detailed herein.

Figure 3:
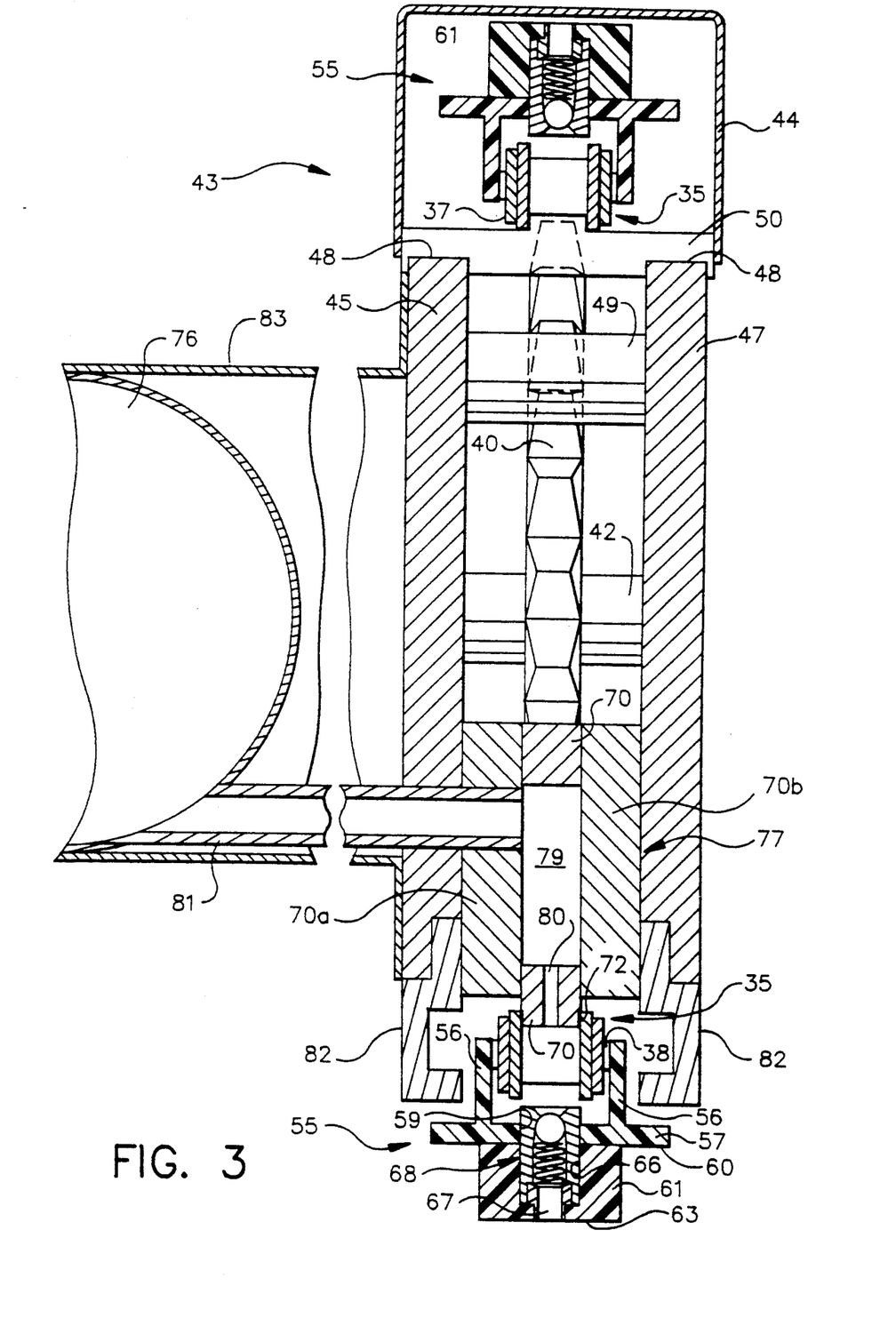
FIG. 3 is a partial vertical cross-sectional view of the upper conveyor member of FIG. 1, taken along line 3—3 thereof and illustrating the air pulse station.
Figure 4:
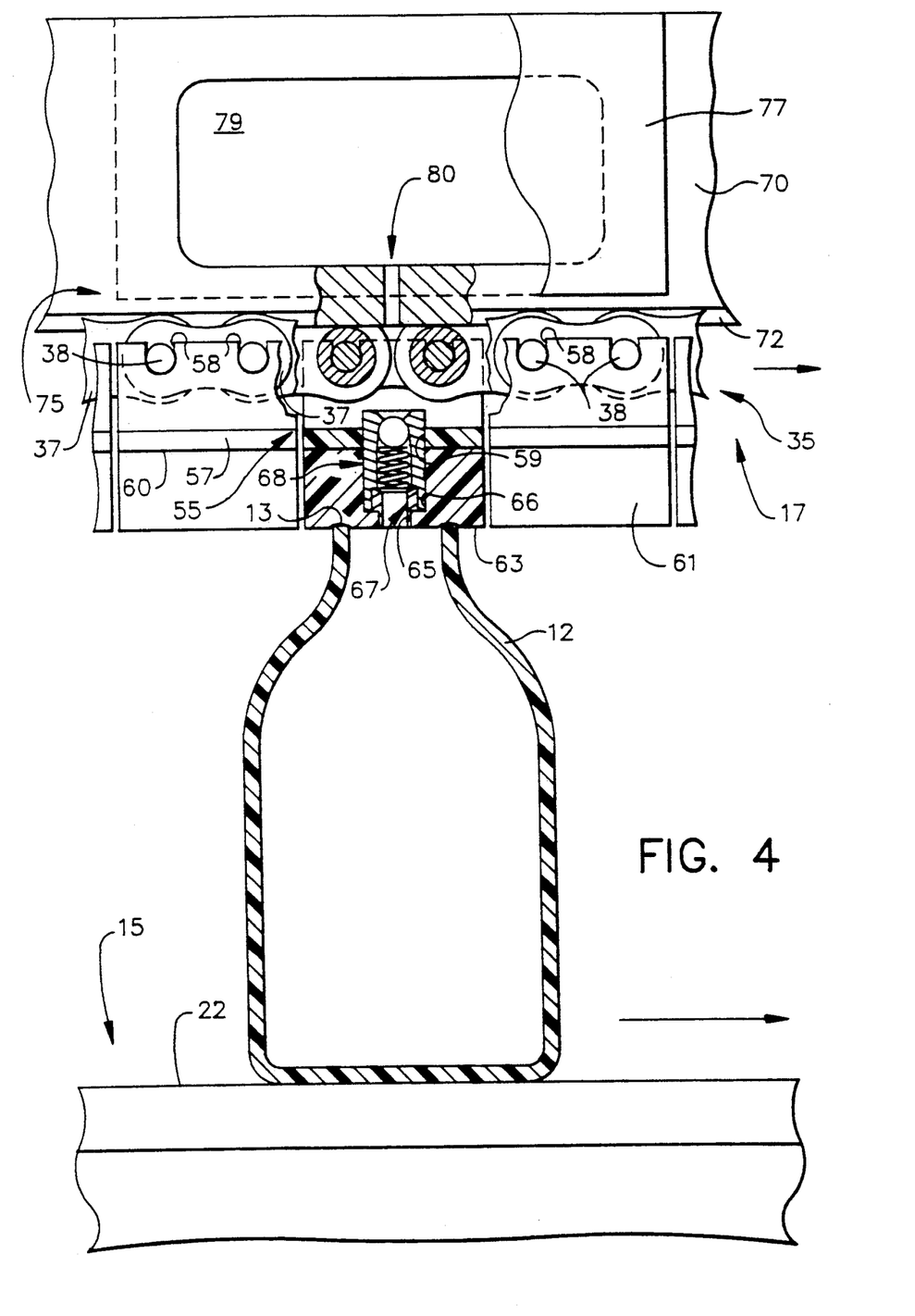
FIG. 4 is a partial cross-sectional view of the labeling apparatus as shown in FIG. 2, taken along line 4—4 thereof.

As illustrated in the drawing figures, upper conveyor 17 is also substantially continuous in nature and is generally longitudinally aligned with lower conveyor 15 along processing axis A. Upper conveyor 17 further preferably comprises a single, link-type drive chain (e.g., 35) comprising a plurality of rigid links 37 connected by link pins 38 (as best seen in FIGS. 3 and 4). Drive chain 35 is looped around the oppositely disposed chain sprockets 40 and 41, respectively, to provide a relatively sturdy endless drive means for upper conveyor 17. As will be appreciated, one or more of the chain sprockets (e.g., 41) will be driven, such as via sprocket 52, sprocket 53 and drive shaft 54 shown in FIG. 1. Because the lower and upper conveyors of the present invention will need to move containers 12 in such a way as to maintain their upright condition for labeling procedures, the effective running speed of each of these conveyors must be synchronized. As illustrated in the embodiment shown in FIG. 1, such synchronization can be preferably accomplished along with optimization of efficiency and economy by driving both conveyor systems via a single power source (e.g., S).

Chain sprockets 40 and 41 and drive chain 35 are preferably substantially housed within a covering or housing (e.g., 43) comprising first and second wall covers 45 and 47, respectively (as best seen in FIG. 3). While chain sprockets 40 and 41 will preferably be supported and mounted between first and second wall-covers 45 and 47 (such as via journal/bearing 42), additional supports and/or spacers (e. g., 49) are preferably included at appropriate locations along the longitudinal length of up conveyor 17 to provide for sufficient structural rigidity of housing 43. On the upper edges (e.g., 48) of wall covers 45 and 47, there is further preferably provided a means (e.g., 50) for guiding and supporting chain 35 and its attached mechanisms as they return from the rear end to the front end of upper conveyor 17. Such supporting means can take the form of a chain guide 50 which may comprise one or more lengths of relatively lubric material which can conveniently be fitted over the upper edges 48. As also shown in FIG. 3, a cover or cap 44 can also be placed over the uppermost portions of upper conveyor 17 as desired.

As best seen in the enlarged cross-sectional views of FIGS. 3 and 4, the present invention further features a plurality of top chain carriers 55 which are preferably releasably attached to drive chain 35. Particularly, each carrier 55 is provided as a generally U-shaped member having a pair of spaced parallel sidewalls 56 commonly attached to an outwardly extending planar flange 57. Flange 57 comprises an outwardly oriented planar face 60 and an aperture 59 substantially centrally located thereon between the spaced sidewalls 56. A plurality of snap grooves 58 are also provided to releasably attach carrier 55 along one or more links 37 of drive chain 35. For this purpose, it is preferred that link pins 38 comprise a slightly extended length to protrude outwardly beyond drive chain 35 for rotatably receiving a carrier 55 in snap-type fashion. In this way, a plurality of carriers 55 can be conveniently and selectively attached along the length of drive chain 35 as desired. While the drawing figures herein contemplate close proximity of adjacent carriers 55, a wide variety of spacings between adjacent carriers could also be easily accomplished by simply snapfastening carriers along drive chain 35 at any desired spacing. As will be appreciated, however, it is preferred that adjacent carrier 55 be closely proximate in nature, whereby adjacent planar faces 60 form the equivalent of a substantially continuous table top chain structure. It is contemplated that carrier 55 can be made of a variety of resilient material such as high impact plastic or the like.

Attached adjacent planar face 60 on the carriers 55 is a compressible grip pad 61. While the entire block forming grip pad 61 need not necessarily be compressible, at least the portions adjacent lower face 63 thereof must be at least somewhat compressible in order to sealingly receive the upper edge of opening 13 of bottles or containers 12 to be decorated. It is preferred that grip pad 61 comprise relatively uniform block of compressible material such as urethane (e.g. durometer 40), neoprene or the like.

A pressurizing bore or air receptor 65 is formed through grip pad 61 to provide for fluid communication therethrough, and a slightly enlarged recess 66 is provided to preferably receive a check valve (e.g., 68) therewithin. A nozzle tip 67 may also be arranged within the lower portions of recess 66 and bore 65 to direct fluid pressure into a bottle 12 below. It is preferred that a cheek valve 68 of relatively low activation pressure (e.g., 2-4 psi) will be provided within grip pad 61 to enable one way flow of air or other gas through air receptor 65 into a flexible bottle 12 sealed against lower face 63 during processing operations of the in-line labeler 10.

As also seen best in FIGS. 3 and 4, a chain backup member 70 is provided along substantially the entire longitudinal length L of upper conveyor 17. As mentioned above with respect to lower conveyor 15, because vertical compression of containers (e.g., 12) processed on labeler 10 will be required, sufficient support or backup of the conveyor devices herein is also necessary. Chain backup member 70 insures that drive chain 35 and its attached carriers 55 are well supported against substantial upward vertical movement by compression forces on bottles 12. Backup bar 70 may also be preferably provided with a longitudinal chain guide or groove 72 along which the edges of links 37 of drive chain 35 can conveniently ride as the drive chain is powered for continuous movement.

An air pulse station 75 is provided adjacent inlet end 18 of labeler 10 and comprises a manifold 77 and an air dispersion chamber 79 preferably formed within a portion of backup bar 70. As best seen in FIG. 3, manifold 77 preferably comprises a pair of front and rear plates (e.g., 70a and 70b) sealing the opening formed through backup bar 70. One or more pulse nozzles or valves 80 can be arranged along the longitudinal length of dispersion chamber 79, although in most instances only a single pulsing nozzle will be preferred. Air pressure is provided from source 76 to manifold 77 through supply line 81 (within housing 83) and pulse nozzle 80 substantially simultaneously with the compressive reception of a bottle 12 between the upper surface 22 of lower conveyor 15 and lower face 63 of grip pad 61.

The vertical distance (h) between upper surface 22 and the lower face 63 will be adjusted to be a predetermined amount smaller than height H of bottles 12 (e.g., 0.09"-0.19" or 2.29 mm - 4.83 mm vertical spacing h for bottle heights H of about 10" or 254 mm) to provide a compression fit for the bottles between the upper and lower conveyors. A bottle 12 will be provided at inlet end 18 such that as the corresponding carrier 55 and its grip pad 61 rotate around front chain sprocket 40 of upper conveyor 17, bottle 12 will be moved onto upper surface 22 such that as the labeling device 10 continues the bottle will be drawn into inlet end 18 and compressively received in a manner generally shown in FIG. 4, with its upper edge 13 sealingly compressed against lower face 63.

As a bottle 12 is compressively received at the inlet end 18 of labeler 10, a sensing device (e.g., optical device 78) indicates the location of the incoming bottle and triggers air pulse station 75 to provide a predetermined volume of air, inert gas, or the like through nozzle valve 80, through the open or unducted space between the links 37 of drive chain 35, and into and through check valve 68 and nozzle tip 67 of grip pad 61.

As will be appreciated, the simple design of the present invention enables easy interchange of relatively modular carriers and grip pad combinations, while simplifying the number of parts, assembly and maintenance procedures, and operation of the air inflation capabilities of the labeling device. For example, the volume and pressure of air can be easily adjusted to accommodate bottles of different sizes and rigidities, as can the carrier/grip pad combination. For larger mouthed bottles, a grip pad of larger size and/or of different compressible capabilities might be required. Such changes could be quickly implemented by snapping in new carrier/grip pad combinations as needed. Similarly, grip pads having check valves of varying size and resistance could easily be interchanged for applications requiring higher or lower pressure ranges.

As seen best in FIG. 2, it is contemplated that containers 12 will be appropriately queued and fed into inlet end 18 via an inlet conveyor (e.g., 86) such as a screw feed conveyor or the like. As is known in the industry, such inlet conveyors can provide appropriate spacing and timing of successive bottles or the like for labeling operations. Once a container 12 is compressively received between conveyors 15 and 17 and appropriately pressurized at air pulse station 75, as described above, the container will be conveyed along longitudinal axis A past one or more labeling stations (e.g., 89 and 90), which may preferably comprise microstepping label applicator devices as known in the industry. Such labeling stations may also include backup rolls (not shown) as appropriate. Due to the compressive holding arrangement provided by labeler 10 between its upper and lower conveyors, and the unique sealing and pressure retaining nature of carrier 55 and its grip pad 61, the inflation pressure within the individual containers 12 moved along labeler 10 will be maintained throughout substantially the entire length L of the labeler. Particularly, only when carrier 55 and its grip pad 61 are smoothly angled away from container 12 as drive chain 35 curves upwardly and around second chain sprocket 41 will the pressure within the container be slowly released. As will be appreciated, the diameters of chain sprockets 40 and 41 are preferably chosen to facilitate the smooth compressive loading of containers adjacent inlet end 18, as well as the smooth release of pressure and withdrawal of carrier 55 from container 12 adjacent outlet end 20. In this way, containers 12 can be fully decorated by a plurality of labeling stations situated along longitudinal axis A without a need for repressurizing the containers or moving the containers from one orientation to another.

The decorated containers are then preferably removed from labeling device 10 via outlet conveyor 87, as illustrated. As will be appreciated, as a result of the unique utilization of a single open-link chain for driving member 35, relatively simple sealing and pressurizing procedures can be accomplished without a need for complex pressure delivery tubes, numerous pressure delivery stations, and/or dynamic sealing arrangements to maintain pressure within the container. As illustrated in FIG. 3, optional chain guards (e.g., 82) can be added to enclose portions of the moving chain 35, for additional cleanliness and to minimize the possibility of external interference with the labeler of the present invention.

Having shown and described the preferred embodiments of the present invention, further adoptions of the in-line air inflation labeling device of the present invention can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. An apparatus for continuous in-line labeling of flexible walled bottles or similar hollow containers of predetermined height and having upper and lower ends with an opening adjacent said upper end, said apparatus comprising:

a first continuous conveyor support having a longitudinal length from its front inlet end to its rear outlet end, said first conveyor support having a relatively flat upper surface for receiving and supporting a plurality of bottles in spaced, upright and in-line condition;

a continuous upper conveyor member corresponding and substantially aligned with said first conveyor support in vertically spaced relationship along a substantial portion of said longitudinal length to provide a compression fit for bottles therebetween, said upper conveyor member comprising a single endless chain having a plurality of downwardly depending compression wedges attached therealong and a chain backup member, said wedges being at least partially compressible and each having a bottle opening seat for sealingly receiving the opening of a bottle supported between said first and upper conveyors and a one way air receptor opening extending through said wedge, said backup member supporting said chain and its wedges against upward movement when subjected to compression forces in use;

means for selectively adjusting the vertical spacing between said upper surface of said first conveyor and said wedges of said upper conveyor, whereby said apparatus is easily adjustable to accommodate bottles of various predetermined heights, said vertical spacing adjusted to remain less than a particular predetermined height of bottles to be labeled to provide a compression fit for said bottles between said upper surface and said wedges;

an air pulse station located above and spaced from said wedges compressing bottles onto said upper surface comprising a nozzle to direct pulsed air through said space and said moving endless chain into a bottle therebelow said first and upper conveyors, said pulsed air inflating said flexible bottle and resisting said compression; and a labeling station located along said apparatus between said inlet and outlet ends.

2. The apparatus of claim 1, wherein said chain backup member extends along a substantial portion of said longitudinal length.

3. The apparatus of claim 2, wherein said air pulse station comprises a nozzle located adjacent said backup member and directed downwardly to pulse air through the moving chain.

4. The apparatus of claim 2, wherein said endless chain comprises a plastic chain and having a plurality of spaced openings formed therein, and against which a compression wedge can be attached.

5. The apparatus of claim 1, wherein said wedges comprise a relatively centrally located compressible sealing pad and a one-way air valve extending through said pad.

6. The apparatus of claim 1, wherein said air pulse station further comprises a sensing mechanism to indicate when a bottle is aligned for compression fit between said first and upper conveyors, and means for appropriately timing the application of said air pulse to inject air into said bottle via said air receptor.

7. The apparatus of claim 2, further comprising a substantially U-shaped wedge carrier which is releasably attached to said chain.

8. The apparatus of claim 1, wherein said compression wedges are interchangeably and releasably attached to said chain by a carrier which can be snap-fastened to said chain as desired.

9. An apparatus for continuous in-line labeling of flexible walled bottles or similar hollow containers of predetermined height and having upper and lower ends with an opening adjacent said upper end, said apparatus comprising:
   a first continuous conveyor support having a longitudinal length from its front inlet end to its rear outlet end, said first conveyor support having a relatively flat upper surface for receiving and supporting a plurality of bottles in spaced, upright and in-line condition.
   an upper continuous conveyor member corresponding and substantially aligned with said first conveyor support in vertically spaced relationship to provide a compression fit for bottles along a substantial portion of said longitudinal length, said upper conveyor member comprising an endless single chain having a plurality of downwardly depending compression wedges attached in spaced relationship therealong and a chain backup member, said wedges being at least partially compressible and each having a bottle opening seat for sealingly receiving the opening of a bottle supported between said first and upper conveyors and a one way air receptor opening extending through said wedge, said backup member supporting said chain and its wedges against upward movement when subjected to compression forces in use;
   means for selectively adjusting the vertical spacing between said upper surface of said first conveyor and said wedges of said upper conveyor, whereby said apparatus is easily adjustable to accommodate bottles of various predetermined heights, said vertical spacing adjusted to remain less than a particular predetermined height of bottles to be labeled to provide a compression fit for said bottles between said upper surface and said wedges;
   an air pulse station located above and spaced from said wedges compressing bottles onto said upper surface comprising a nozzle to direct pulsed air through said space and said moving endless chain into a bottle therebelow via said receptor opening after said compression fit is provided between said first and upper conveyors, said pulsed air inflating said flexible bottle and resisting said compression, and
   a labeling station located along said apparatus between said inlet and outlet ends;

10. The apparatus of claim 9, wherein said backup member is substantially continuous and extends along a substantial portion of said longitudinal length and aligned with said attached wedges.

11. The apparatus of claim 9, wherein said air pulse station comprises a nozzle located adjacent said backup member and directed downwardly to pulse air through the moving chain.

12. The apparatus of claim 9, wherein said endless chain comprises a plastic chain and having a plurality of spaced openings formed therein, and against one or more of which a compression wedge can be attached.

13. The apparatus of claim 9, wherein said wedges comprise a relatively centrally located compressible sealing pad and a one-way air valve extending through said pad.

14. The apparatus of claim 9, wherein said air pulse station further comprises a sensing mechanism to indicate when a bottle is aligned for compression fit between said first and upper conveyors, and means for appropriately timing the application of said air pulse to inject air into said bottle via said air receptor.

15. The apparatus of claim 9, further comprising a substantially U-shaped wedge carrier which is releasably attached to said chain.

16. The apparatus of claim 9, wherein said compression wedges are interchangeably and releasably attached to said chain by a carrier which can be snap-fastened to said chain as desired.

17. A method of labeling bottles having a predetermined height and relatively flexible sidewalls with pressure sensitive labels, wherein said bottles are to be labeled in-line and in upright condition, said method comprising the following steps:
   providing an in-line labeling apparatus having an inlet end and an outlet end, and a pair of upper and lower endless conveyors, said upper conveyor comprising a single link-type chain having a plurality of spaced downwardly depending compression wedges attached therealong and a chain backup member, said wedges being at least partially compressible and each having a bottle opening seat for sealingly receiving the opening of a bottle supported on said first conveyor and a one-way air receptor opening extending through said wedge, said backup member supporting said chain and its wedges against upward movement in use;
   spacing said upper and lower conveyors at a predetermined vertical distance which is less than said predetermined height of said bottles to be labeled to provide a compression fit support of said bottles as they are conveyed along said longitudinal length;
   inserting bottles between said upper and lower conveyors, whereby a compression fit is provided between an aligned wedge, bottle, and said lower conveyor to hold said bottle in upright condition;
   pressurizing said bottle to resist said compression by means of a pulse of air directed into said bottle from an air pulse station located above and spaced from said wedges, thereby facilitating maintenance of said bottle in said compression fit and effectively rigidifying said bottle;

maintaining the pressurized bottle in upright and compressed fit condition as it is conveyed along a substantial portion of said labeling apparatus between its inlet and outlet ends;

applying one or more pressure sensitive label to said pressurized and compression fit bottle as it is conveyed along said labeling apparatus; and releasing the pressure from said bottle.

18. The method of claim 17, wherein said bottle is pressurized by said pulse of air is directed to said wedge through unducted space within said upper conveyor and through said link-type chain.

19. The method of claim 17, wherein said bottle is pressurized at substantially the same time as the provision of said compression fit of said bottle between said upper and lower conveyors.

20. The method of claim 17, wherein said step of spacing said upper and lower conveyors comprises adjusting the vertical distance between said compression wedges and said lower conveyor to be slightly less than the predetermined height of the bottles to be labeled.

* * * * *

UNITED STATES PATENT AND TRADEMARK OFFICE
CERTIFICATE OF CORRECTION

PATENT NO. : 5,259,912

DATED : November 9, 1993

INVENTOR(S) : Carl L. Cline

It is certified that error appears in the above-identified patent and that said Letters Patent is hereby corrected as shown below:

```
Column 8, line 61:
Claim 1, line 42, after "therebelow" and before
    "said first", add the following:
        --via said receptor opening as said
          compression fit is provided between--
Column 9, line 36:
Claim 9, line 11, the "." following "condition"
    should be a --;--.
Column 10, line 6:
Claim 10, line 1, after "claim 9", the "." should
    be a --,--.
```

Signed and Sealed this

Thirty-first Day of May, 1994

Attest:

BRUCE LEHMAN

Attesting Officer

Commissioner of Patents and Trademarks